United States Patent
Färbert et al.

(10) Patent No.: US 10,228,519 B2
(45) Date of Patent: Mar. 12, 2019

(54) OPTICAL CONNECTING SYSTEM FOR CONNECTING A FIRST AND A SECOND OPTICAL DEVICE

(71) Applicant: ADVA Optical Networking SE, Meiningen (DE)

(72) Inventors: Andreas Färbert, Munich (DE); Markus Noller, Weissach im Tal (DE)

(73) Assignee: ADVA Optical Networking SE, Meiningen (DE)

( * ) Notice: Subject to any disclaimer, the term of this patent is extended or adjusted under 35 U.S.C. 154(b) by 0 days.

(21) Appl. No.: 15/966,219

(22) Filed: Apr. 30, 2018

(65) Prior Publication Data
US 2018/0335576 A1    Nov. 22, 2018

(30) Foreign Application Priority Data
May 16, 2017    (EP) .................... 17171369

(51) Int. Cl.
*G02B 6/38* (2006.01)
*G02B 6/42* (2006.01)
*H04B 10/07* (2013.01)

(52) U.S. Cl.
CPC .......... *G02B 6/385* (2013.01); *G02B 6/4292* (2013.01); *H04B 10/07* (2013.01)

(58) Field of Classification Search
CPC ....... G02B 6/385; G02B 6/4292; H04B 10/07
USPC ........................................................ 398/16
See application file for complete search history.

(56) References Cited

U.S. PATENT DOCUMENTS

| 5,394,503 A * | 2/1995 | Dietz, Jr. ............. G02B 6/3817 385/134 |
| 2008/0219665 A1 | 9/2008 | Ikai |
| 2011/0052122 A1* | 3/2011 | Brucher ............... G02B 6/3885 385/54 |
| 2011/0103803 A1* | 5/2011 | Kolesar ................ G02B 6/4472 398/142 |
| 2011/0176779 A1* | 7/2011 | Kolesar ................ G02B 6/4249 385/77 |
| 2014/0093233 A1* | 4/2014 | Gao ................... H04B 10/0799 398/16 |
| 2015/0208146 A1 | 7/2015 | Younce et al. |
| 2016/0020912 A1* | 1/2016 | Charbonneau-Lefort .................. H04L 12/12 398/139 |
| 2016/0041065 A1 | 2/2016 | L'Heureux et al. |

FOREIGN PATENT DOCUMENTS

| EP | 1968227 A2 | 9/2008 |
| WO | 2015179449 A2 | 11/2015 |

* cited by examiner

*Primary Examiner* — Dalzid E Singh
(74) *Attorney, Agent, or Firm* — The Webb Law Firm (57) ABSTRACT

An optical connecting system for connecting a first and a second optical device includes a first and a second multi-fiber device connector included in the first and second optical device and a multi-fiber optical connection cable including a plurality of optical fibers and having a first and a second multi-fiber cable connector at a first and second end thereof and being adapted to be connected to the first and second multi-fiber device connector. The optical devices are configured to transmit to and/or receive from the other optical device wanted optical data signals via optical fibers of the multi-optical fiber connection cable.

20 Claims, 7 Drawing Sheets

OPTICAL CONNECTING SYSTEM FOR CONNECTING A FIRST AND A SECOND OPTICAL DEVICE

CROSS-REFERENCE TO RELATED APPLICATION

This application claims priority to European Patent Application No. 17 171 369.6 filed May 16, 2017, the disclosure of which is hereby incorporated in its entirety by reference.

BACKGROUND OF THE INVENTION

Field of the Invention

The invention relates to an optical connecting system for connecting a first and a second optical device and to an optical device for realizing such an optical connecting system.

Description of Related Art

Optical devices, such as modules of an optical transmission apparatus (e.g. channel cards, multiplexer cards or reconfigurable optical add/drop multiplexers (ROADMs)), may be connected in various manners. In order to transmit several or a plurality of wanted optical data signals between two optical devices, e.g. high bit rate optical channel signals or optical WDM signals, a multi-fiber connection cable having a multi-fiber cable connector at each end thereof is used. If, in addition, electrical energy is to be transferred from the first to the second optical device, an additional electrical cable connection is required. In case an additional management channel, for example an optical management channel, is to be established between the first and second optical device, a further electrical or optical connection cable might be necessary. Thus, in the worst case, three connection cables are required/used for connecting two optical devices.

Especially during installation and maintenance, a proper connectivity of the optical fiber connections is paramount. In order to monitor or check the connectivity of the optical connections various methods are applied. One method is to use a special optical patch cable, which contains an additional electrical wire. This electrical connection is used to check the connectivity of the optical connection. Another method is using the optical signal itself, wherein test signals may be implemented. The drawback of this method is that a signal on the data path has to be present for the connectivity check during installation or maintenance. It is further known to use an additional light source, which is looped into the signal path. However, this requires a proper drop of this additional test signal and the possible interference of the test signal with the wanted data signal on the same path.

In addition to such a mere connection check it might be desired to transmit additional identification, control or management information between the optical devices. Such management of channels is commonly implemented by sharing the signal path, i.e. transmitting the wanted data signal and management signals via the same path. This technique requires additional effort in order to prevent interfering effects and other signal degradation.

It is thus an object of the present invention to provide an optical connecting system for connecting a first and a second optical device which implements a connection check without any deterioration of the wanted data signals and which can be realized in a simple and inexpensive manner. It is a further object of the invention to provide an optical device for realizing such an optical connecting system.

SUMMARY OF THE INVENTION

The invention starts from the finding that multi-fiber connection cables, especially so-called ribbon connection cables, that are provided at each end with a multi-fiber cable connector, e.g. a standardized multi-fiber push-on (MPO) connector, can be used to implement a simple and inexpensive method and device to check a correct connection between two optical devices. Such multi-fiber connection cables are commonly available with a standardized number of fibers and respective dedicated ports of the two multi-fiber cable connectors, e.g. 8, 12, 24 or 48 fibers and ports per multi-fiber cable connector. The ports of a standardized MPO connector are preferably provided in one straight row (in a front view of the male or female multi-fiber MPO connector). Therefore, in many cases at least one of the optical fibers of the multi-fiber connection cable and the respective ports remain unused.

According to the invention such an unused fiber and the respective multi-fiber connection cable connector ports are used in order to implement an optical connection system that provides a connection check. For this purpose, a first optical device supplies a first optical connection signal to a transmit control port of a first multi-fiber device connector, which is comprised by the first optical device. If the transmit control port of the first multi-fiber device connector is connected to a respective control port of the multi-fiber cable connector, the first optical connection signal is transmitted, via a respective optical fiber of the multi-fiber optical connection cable, to a dedicated control port of the multi-fiber cable connector that is provided at the other end of the multi-fiber connection cable. If this multi-fiber cable connector control port is connected to a respective receive control port of a second multi-fiber device connector, which is comprised by the second optical device, the first optical connection signal can be received by the second optical device. The second optical device is configured to detect whether the first optical connection signal received matches one or more predetermined criteria, wherein the second optical device assumes a correct connection to the first optical device via the multi-fiber optical connection cable if the one or more predetermined criteria are matched. In the following, such criteria are referred to as connection check criteria.

As such a connection check criterion, the optical wavelength or optical spectrum of the optical control signal can be used. For this purpose, the second optical device may comprise an optical filter in combination with a broadband optical receiver device, so that the optical control signal can only be detected if it has an optical spectrum that at least overlaps (or fully falls within) the pass band of the optical filter.

As another connection check criterion, the optical power of the optical connection signal received may be used. The second optical device may assume a correct connection to the first optical device only in case the optical power of the optical connection signal received exceeds a predetermined threshold value.

Of course, also a combination of the two examples of connection check criteria may be used, i.e. the correct wavelength or spectrum must be met and the optical power received must exceed a predefined threshold value.

According to an embodiment of the invention, also the second optical device is configured to supply an optical connection signal (a second optical connection signal) to a transmit control port of the second multi-fiber device connector and the first optical device is configured to receive and detect the second optical connection signal that is transmitted through a respective optical fiber of the multi-fiber optical connection cable to a receive control port of the first multi-fiber device connector. According to the invention, no wanted optical data signal is transmitted over the optical path that guides the second optical connection signal, and also the first optical device is configured to detect whether the second optical connection signal received matches one or more predetermined criteria, wherein the first optical device is configured to assume a correct connection to the second optical device via the multi-fiber optical connection cable if the one or more predetermined criteria are matched.

In this way, both optical devices are in a position to check whether the respective other optical device is correctly connected via the optical multi-fiber connection cable. As the optical path or the optical paths for the first and second optical connection signal is/are totally independent of any optical path that is used for the one or more wanted optical data signals, no deterioration of the one or more wanted optical data signals is caused. The properties of the first and second connection signals may be freely chosen.

According to a further embodiment, the transmit control port and the receive control port of the first multi-fiber device connector of the first optical device and the transmit control port and the receive control port of the second multi-fiber device connector of the second optical device are separate ports. Correspondingly, the first and second optical connection signals are guided in separate optical paths, each comprising a separate optical fiber of the multi-fiber optical connection cable. This embodiment can be implemented without any splitting/combining means for separating/combining the optical paths for the first and second optical signal as is the case if a single optical fiber is used for the first and second optical connection signal.

In a preferred embodiment, the first and/or second multi-fiber device connector comprises a plurality of ports, including the respective transmit and receive control ports, which are provided in an elongate cross-section having a first and second outer end region lying opposite each other, wherein the respective transmit control port is provided in the first outer end region and the respective receive control port is provided in the second outer end region. Thus, if both optical devices correctly receive the respective optical connection signal, it can be assumed with a very high probability, that all ports of the multi-fiber cable connector, especially the ports for the wanted data signals, are connected correctly to the respective ports of the multi-fiber device connectors and not only the transmit and control ports, which are provided in the optical path(s) of the optical connection signals.

Of course, as is the case for most commercially available multi-fiber connectors, the plurality of ports may be arranged in one row or several parallel rows and the respective transmit and receive control ports may be located at the end of a selected one of the rows. Preferably, the outermost ports may be chosen as transmit and control ports.

In another embodiment of the invention, the transmit control port and the receive control port of the first multi-fiber device connector are physically identical and form a common control port to which the first optical device supplies the first optical connection signal and at which the first optical device receives the second optical connection signal. Also, the transmit control port and the receive control port of the second multi-fiber device connector are physically identical and form a common control port to which the second optical device supplies the second optical connection signal and at which the second optical device receives the first optical connection signal. In other words, this alternative may be applied if only a single fiber is left for realizing the connection check in both directions. However, splitting/combining of the signal paths of the connection signal that is received and the connection signal that is transmitted is required.

In such an embodiment, the first and/or second multi-fiber device connector may comprise a plurality of ports, including the respective common control port, which are provided in an elongate cross-section having a first and second outer end region lying opposite each other and a center portion between the first and second outer end region, wherein the respective transmit control port is provided in the center portion. In this way, if the optical devices both correctly receive the respective connection signal and assume a pass of the connection check, there is a high probability that all other ports of the multi-fiber cable connectors are also correctly connected to the respective multi-fiber device connectors.

If a common fiber is used for the optical path of both connection signals, each of the first and second optical devices comprises an optical 3-port device, wherein each optical 3-port device is configured to receive the respective first or second optical connection signal that is to be transmitted to the respective other optical device at a first port and to pass it through to a second port and to receive the respective second or first optical connection signal that is to be received at the respective optical device at the second port and to pass it through to a third port. The 3-port device may be an optical circulator, a wavelength independent 1×2 optical coupler or, in case the optical connection signals lie in different optical bands, a wavelength dependent 1×2 optical coupler or an optical diplexer.

If the first and second optical devices are configured to create the first and second optical connection signals at differing first and second wavelengths or in such a way that the optical spectra of the first and second connection signals do not overlap to a relevant extent, the optical 3-port device may also be a wavelength independent optical splitter (i.e. a wavelength independent optical coupler), preferably an optical 3 dB-splitter. In such an embodiment, an optical filter is provided in the optical path of the optical connection signal between a splitting point or splitting portion of the optical splitter and its third port, wherein the optical filter is configured to essentially block a reflected portion of the optical connection signal that is supplied to the first port of the optical splitter. In this way, reflected portions of the optical connection signal that is transmitted from one of the optical devices do not influence the optical connection signal that is created by the other optical device and detected at the respective optical device.

According to the invention, the first or the first and second optical devices may comprise, in order to create and transmit the respective first or second optical connection signal, an optical transmitter device, which is directly or indirectly optically coupled to the respective transmit control port. The optical transmitter device may comprise an optical transmitter, e.g. a laser diode or a light emitting diode. As it is sufficient to use an optical transmitter that is able to create a CW optical connection signal or an optical connection signal, which is modulated with a low-frequency modulation signal in order to additionally transmit identification and/or management information to the respective other optical device, low cost optical transmitters may be used in order to realize the connection check system.

According to an embodiment of the invention, the optical transmitter device may be configured to create the respective first or second optical connection signal in such a way that it includes an identification information and/or management information to be transmitted to the respective other optical device, wherein the identification information comprises at least one of a predetermined wavelength or optical spectrum of the optical connection signal or is comprised in a modulation component of the optical connection signal and wherein the management information is comprised in a modulation component of the optical connection signal.

In this way, the optical system according to the invention is not only able to carry out an optical connection check (i.e. to check whether the optical devices are correctly connected by means of the multi-fiber optical connection cable) but also to transfer identification information and/or management information from the optical device that creates the optical connection signal to the respective other optical device.

According to a further embodiment of the invention, the first or second optical device may comprise, in order to receive and detect the respective second or first optical connection signal, an optical receiver device, which is optically coupled to the respective receive control port and which is configured to convert the respective second or first optical connection signal received into an second or first electrical control signal and to supply the second or first electrical control signal to a control device, which is configured to detect whether the second or first electrical control signal matches one or more predetermined criteria.

For this purpose, the respective control device may be configured to convert the respective electrical control signal into a digital signal by means of an ND-converter and to analyze, e.g. by means of a digital controller device, whether the digital signal matches the one or more predetermined criteria.

Of course, the optical receiver and detection device of the second or first optical device may be configured to detect and evaluate the identification information and/or the management information. For this purpose, the optical receiver and detection device may comprise a demodulator device and/or a digital controller device for further processing the identification or management information. Of course, the digital controller device may take over the demodulation function if the signal received has already been converted into a digital signal, e.g. by applying a Fast-Fourier Transform (FFT) demodulation algorithm.

This makes it possible to use the optical path comprising the optical fiber that is not used for transferring a wanted optical signal not only for checking the correct optical connection via the multi-fiber optical connection cable and, as the case may be, for transferring identification and/or management information but also to transfer energy to the respective other optical device.

According to another embodiment of the invention, the first or second optical device comprises, in order to transfer energy to the respective other optical device, one or more optical power sources creating one or more optical power signals that are supplied to one or more power transmit ports of the respective multi-fiber device connector, and the respective other optical device comprises one or more light-to-power converters which are configured to receive, from respective one or more power receive ports of the respective multi-fiber device connector, the optical power that is transmitted from the first or second optical device to the respective optical device, wherein no wanted optical data signal is transmitted over the optical paths that guide the one or more optical power signals.

In this way, one or more additional spare fibers that are not used for realizing the connection check or for transmitting the wanted optical data signal(s) can be used for transmitting energy to the respective other optical device. This energy is transmitted optically and, after the re-conversion into electrical energy, can be used in order to supply electrical energy to the respective optical device or selected parts or components thereof.

According to an alternative embodiment, the second optical device comprises an optical power source which is configured to create an optical power signal and to supply the optical power signal to the control port of the second multi-fiber device connector via an optical path separating means, which is configured to separate/combine the optical paths of the first optical connection signal and the optical power signal. Correspondingly, the first optical device is configured to receive the optical power signal, which is supplied to the transmit control port, via a path separating means, which is configured to separate/combine the optical paths of the first optical connection signal and the optical power signal, and to convert the optical power signal into electrical power. Of course, the first optical device may comprise a light-to-power converter in order to convert the optical power receive (the optical power of the optical power signal received) into electrical power. In this alternative, the connection check is carried out by the second optical device, which receives and evaluates the first optical connection signal created by the first optical device, and energy is transferred from the second to the first optical device. Only a single optical fiber is required for both purposes or tasks.

The means for separating/combining the optical paths may be realized as optical 3-port devices having suitable properties, e.g. as optical circulators, wavelength-independent optical 1×2 couplers or, if wavelength-selective separating/combining is required, as optical diplexers or wavelength-dependent optical 1×2 couplers.

In another embodiment of the invention, the first or second optical device comprises an optical power source which is configured to create the first or second optical connection signal as an optical power signal, in order to additionally transfer energy to the respective other optical device and the respective other optical device is configured to receive the optical power signal and to convert it into electrical power as well as to detect whether the respective optical power signal received matches one or more predetermined criteria, wherein the respective other optical device is configured to assume a correct connection to the first or second optical device via the multi-fiber optical connection cable if the one or more predetermined criteria are matched.

Thus, only a single optical signal is created by one of the optical devices and transmitted to the respective other optical device, wherein this optical signal is received and evaluated as an optical connection signal and at least a predetermined power portion of this signal is converted into electrical energy. Only a single optical signal is required for both the optical connection check and the supply of power to the respective other optical device.

The respective other optical device that receives the optical power signal may, in one alternative, be configured to split the optical power signal asymmetrically, wherein a larger power portion of the optical power signal is supplied to a light-to-power converter and a smaller power portion is supplied to the optical receiver, which is coupled to the control device.

According to another alternative, the respective other optical device that receives the optical power signal is configured to supply the optical power signal to a light-to-power converter, which converts the optical power signal into a respective electrical power signal and is configured to supply the respective optical device with electrical power and to supply the electrical power signal to a control device, which is configured to detect whether the respective optical power signal received matches one or more predetermined criteria. In this embodiment, the light-to-power converter takes over the function of the optical receiver device so that the hardware complexity is reduced.

BRIEF DESCRIPTION OF THE DRAWINGS

Further objects and advantages of the present invention will become apparent from the following description of a preferred embodiment that is given by way of example with reference to the accompanying drawings, wherein.

DESCRIPTION OF THE INVENTION

In the following, various embodiments of the invention will be described in detail without restricting the invention to these embodiments. Especially, most features that are described in connection with a specific embodiment may also be used in connection with selected or all other embodiments.

Figure 1:
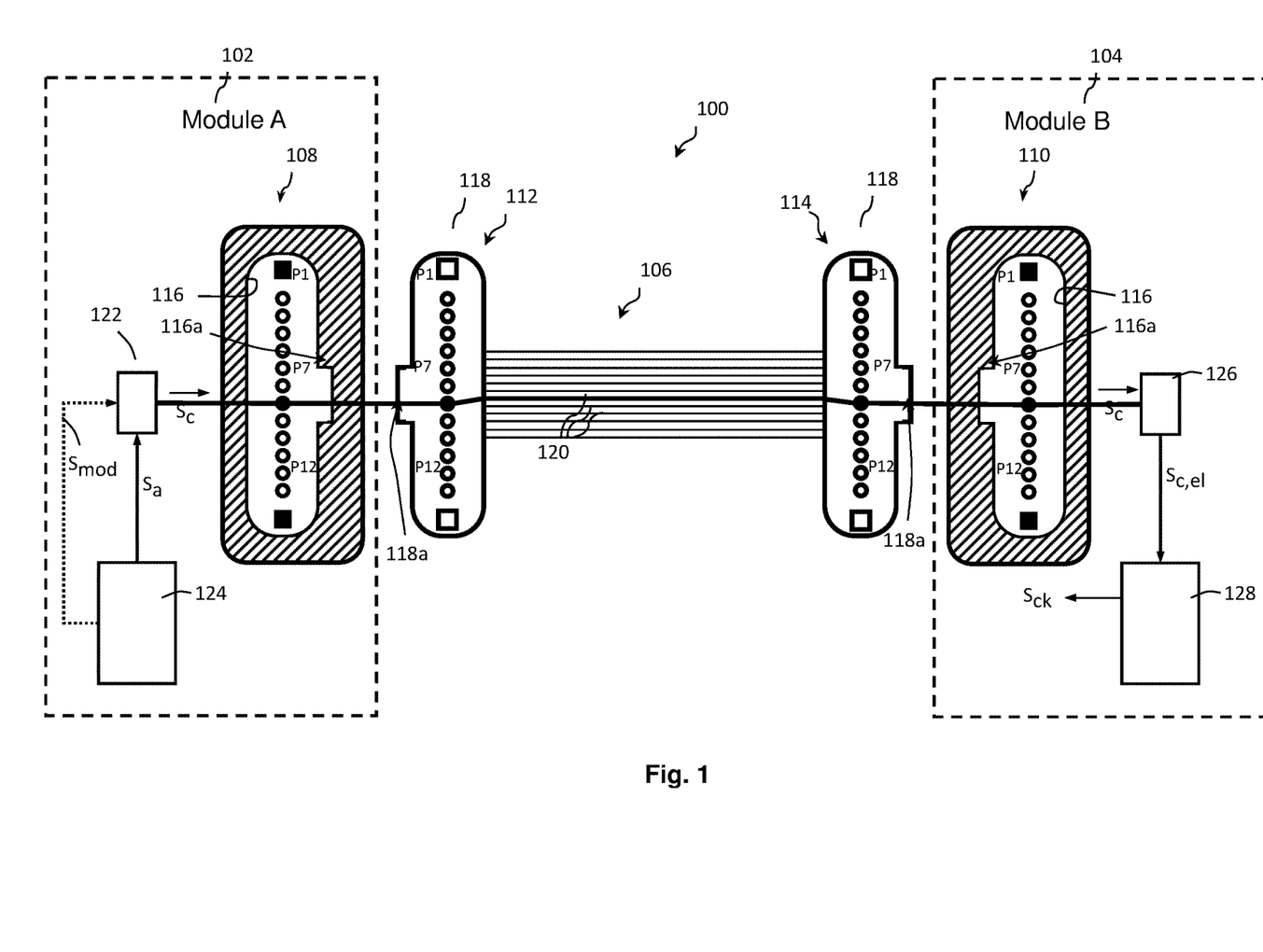
FIG. 1 shows a schematic block diagram of a first embodiment of the optical connection system according to the invention, wherein a single optical connection signal is used to carry out the connection check at one of the optical modules, only.

FIG. 1 shows an optical system 100 comprising two optical modules or devices 102, 104, which are connected via a multi-fiber optical connection cable 106. The optical system 100 may e.g. realize a headend or a node of an optical WDM transmission network and the optical devices 102, 104 (also designated in all drawings as modules A and B) may e.g. be a multiplexer card, an optical WDM transmission module comprising a plurality of channel transmitter cards, an optical multiplexer card or module, an reconfigurable optical add/drop multiplexer (ROADM) or the like. Each optical device 102, 104 comprises a multi-fiber device connector 108, 110 that has a plurality of ports, e.g. 12 equidistant ports P1 to P12, provided along a straight line. Such multi-fiber connectors are commercially available as multi-fiber push on (MPO) connectors. FIG. 1 shows a schematic top view of the multi-fiber device connectors 108, 110.

The multi-fiber optical connection cable 106 comprises an optical multi-fiber cable connector 112, 114 provided at each end thereof, wherein FIG. 1 shows a schematic top view of the multi-fiber device connectors 112, 114. Each of the multi-fiber cable connectors 112, 114 comprises the same number of ports, e.g. ports P1 to P12, as the multi-fiber device connectors 108, 110 and is constructed in such a manner that each port thereof can be connected to a dedicated port of the respective multi-fiber device connector 108, 110 by simply plugging the (male or female) multi-fiber cable connector 112, 114 into the corresponding (female or male) multi-fiber device connectors 108, 110. Of course, the multi-fiber cable connectors 112, 114 have a design complementary to the design of the multi-fiber device connectors 108, 110. In order to avoid a connection of the connectors 108, 110 and 112, 114 in a 180° shifted position, the connectors are provided with a shape that allows a connection in one position only (mechanical coding). As apparent from FIG. 1, the multi-fiber device connectors 108, 110 have a receiving opening 116 comprising a recess 116a and the multi-fiber cable connectors 112, 114 comprise a connector casing 118 having an outer shape which is complementary to the receiving opening 116. A notch 118a of the connector casing 118 that is complementary to the recess 116a ensures the desired mechanical coding.

Each port P1 to P12 of the multi-fiber cable connector 112 is connected to a dedicated port P1 to P12 of the multi-fiber cable connector 114 by an optical fiber 120. Preferably, the optical connection cable 106 realizes a 1-to-1 connection of the ports of the multi-fiber cable connectors 112, 114, i. e. corresponding ports at the same position within the series of ports of each of the multi-fiber cable connectors 112, 114 are optically connected by an optical fiber 120. The optical fibers 120 may be loose fibers which are encompassed by a cable sheath (not shown) or mechanically connected to each other in the form of a ribbon cable.

As the optical multi-fiber device connectors 108, 110 and the optical multi-fiber cable connectors 112, 114 are commercially available with a standardized number of ports only, in many applications some of the ports P1 to P12 will remain unused by the respective optical devices 102, 104 for transmitting wanted optical data signals. These unused ports may be used to implement an optical connection check and, as the case may be, to add additional functions to the optical devices 102, 104, e. g. transmitting energy to the respective other optical device.

It shall be noted at this point that FIG. 1 shows only those parts and components of the optical modules 102, 104 that are necessary in order to explain the present invention that concerns an optical connecting system for connecting the optical devices 102, 104. As the invention relates to the functionality of carrying out an optical connection check and, as the case may be, transferring energy to the respective other optical devices via the multi-fiber optical cable, the following description focuses on these issues and omits the functionality of the optical devices, especially the functionality of transmitting the wanted optical data signals.

In order to carry out a check whether the multi-fiber cable connectors 112, 114 are correctly connected to the multi-fiber device connectors 108, 110, the optical device 102 comprises an optical transmitter device 122, the optical output port of which is optically connected to a selected port (designated as control transmit port) of the multi-fiber device connector 108. In the embodiment shown in FIG. 1, the optical transmitter device 122 is connected to port P7 of the multi-fiber device connector 108. The optical connection may be realized by an optical fiber. The optical transmitter device is controlled by a controller device 124, which is configured to activate the optical transmitter device 122 so that an optical connection signal $S_c$ is created. The controller device 122 may not only activate the optical transmitter device by supplying an activation signal $S_a$ to the optical transmitter device 124 but also control the optical power of the optical connection signal $S_c$, for example by generating the activation signal $S_a$ in a suitable manner.

Further, the control device 124 and the optical transmitter device 122 may be configured to create the optical connection signal $S_c$ in such a way that it comprises a modulation component including desired information, such as an identification information and/or management information. As shown in FIG. 1, the control device 124 may supply an electrical modulation signal $S_{mod}$ to the optical transmitter device 122. It would, however, also be possible to supply a single electrical signal to the optical transmitter device 122 which controls the optical power of the optical transmitter device 122, wherein the single electrical signal comprises an amplitude modulation component. In this way, an optical connection signal $S_c$ comprising a corresponding amplitude modulation component would be created.

If the optical devices 102, 104 are correctly connected by the multi-fiber optical cable 106, the transmit control port P7 of the multi-fiber device connector 108 is optically connected to the optical port P7 of the multi-fiber device connector 110 (designated as receive control port) of the optical device 104. The optical device 104 comprises an optical receiver 126 the input port of which is optically connected, e.g. by means of an optical fiber, to the receive control port P7 of the multi-fiber device connector 110. The optical receiver device 126 converts the optical connection signal $S_c$ received into a corresponding electrical connection signal $S_{c,el}$, which is supplied to a control device 128 of the optical device 104. The control device 128 is configured to examine the electrical connection signal $S_{c,el}$ whether one or more predetermined criteria are matched and if so, to assume a correct optical connection between the optical devices 102 and 104 by means of the multi-fiber optical cable 106.

As a simple criterion for the connection check a predetermined threshold for the average optical power of the optical connection signal $S_c$ received or a corresponding average electrical parameter (voltage, current, electrical power) of the electrical connection signal $S_{c,el}$ may be used. If this criterion is fulfilled, the control device 128 assumes that a correct optical connection between the optical devices 102, 104 has been established. In this case, the controller unit 128 may create a connection check signal $S_{ck}$ that is supplied to another component of the optical device 104. Of course, the controller device 128 may also be configured to create an internal check signal or use the positive or negative result of the connection check for other tasks that are carried out by the controller device 128.

Of course, other criteria that must be fulfilled for a positive connection check may be used simultaneously. For example, a specific wavelength or optical spectrum of the optical connection signal $S_c$ received may be expected by the optical receiver device 126. For this purpose, the optical receiver device may be realized in a wavelength sensitive manner, e.g. by providing an optical filter in the optical path of the optical connection signal $S_c$. In such an embodiment, a positive connection check is assumed only if an optical connection signal having a suitable wavelength or spectrum is received and if the average power of the optical connection signal $S_c$ received exceeds a predetermined threshold value.

As mentioned above, information may be transmitted from the optical device 102 to the optical device 104 by modulating the optical connection signal $S_c$. This information may, for example, comprise an identification information of the optical device 102, which may be used by the optical device 104 in order to check whether a specific optical device 102 or a suitable type of optical devices 102 has been (correctly) connected. In such an embodiment, a positive result of a connection check is assumed by the control unit 128 only if a correct (expected) identification information has been received. In addition to or instead of an identification information, management information may be transmitted from the optical device 102 to the optical device 104.

As shown in FIG. 1, in an embodiment using a single optical path between the multi-fiber device connectors 108, 110 for the optical connection signal $S_c$ it is preferred to use a respective optical port, as a transmit control port and receive control port, respectively, that is provided in a middle portion of the multi-fiber device connectors 108, 110 (e.g. port P7) instead of ports that are located at the outer end portions (e.g ports P1, P2, P3 or ports P10, P11, P12). This also applies to embodiments described below in which an optical connection check is carried out by both optical devices 102, 104, wherein the two optical connection signals are guided by a single optical path between the respective optical ports of the multi-fiber device connectors 112, 114.

Further, a coding principle can be implemented by selecting a specific port of the multi-fiber device connectors 108, 110 as transmit or receive control ports, wherein specific (different) ports are used for different specific optical devices (of the same type) or different specific types of optical devices. That is, a positive connection check can only be obtained (at a given optical device defining a specific port as receive control port) if an optical device is connected that uses the expected transmit control port. For example, it would be possible to use a first specific port, e.g. port P1, as transmit control for a specific first (type) of optical devices and a second specific port, e.g. port P2, as transmit control port for a specific second (type) of optical devices etc. Of course, a given optical device may comprise more than one multi-fiber device connectors, each of which is configured to be connectable to a specific (type) of optical devices. In this case, using a different port of each of the multi-fiber optical device connectors for transmitting/receiving the optical connection signal can assure that a positive connection check is assumed only if a respective correct (type) of optical device has been connected.

Of course, all other ports which are not used for transmitting the optical connection signal Sc may be used for transmitting other wanted optical signals, for example wanted optical high-bit-rate data signals or low-bit-rate management signals.

Figure 2:
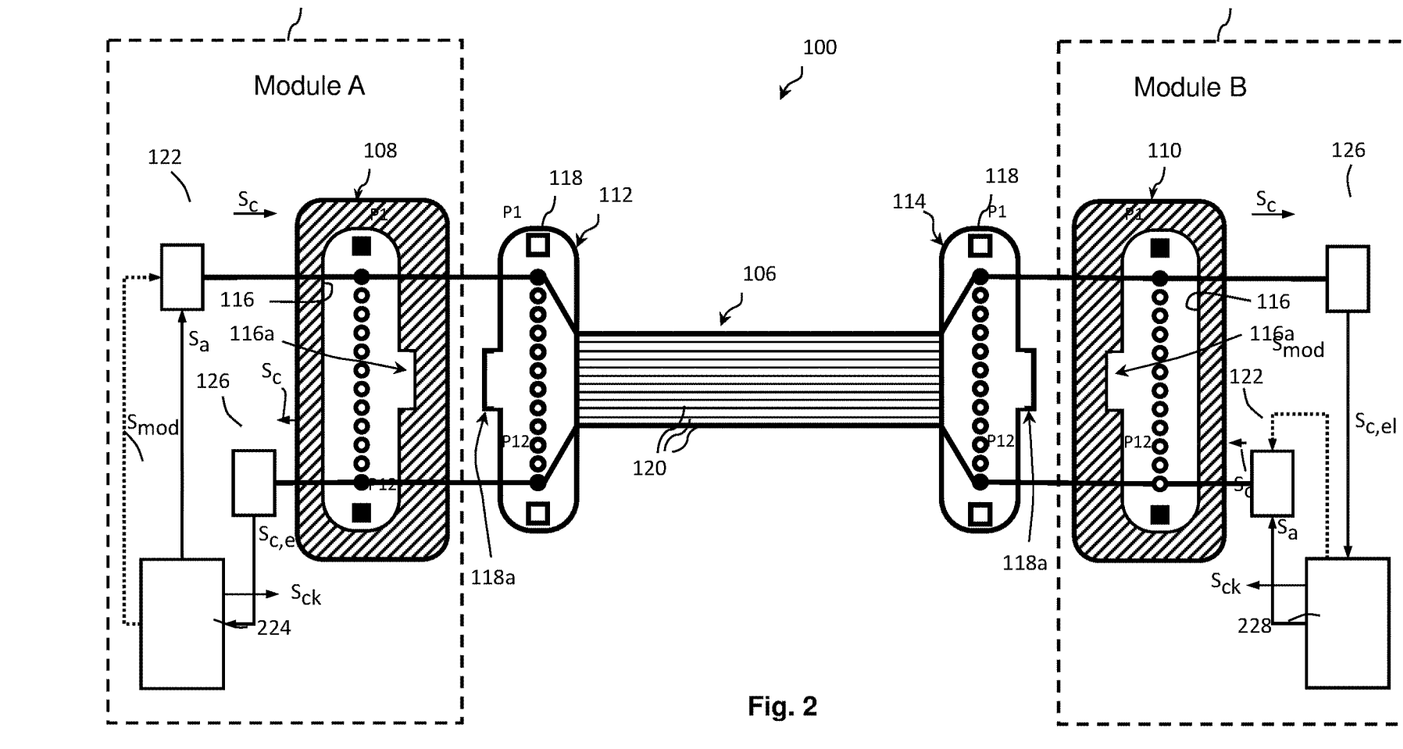
FIG. 2 shows a second embodiment of the optical connection system according to the invention, wherein two optical connection signals transmitted in opposite directions over separate optical paths are used to carry out the connection check at both optical modules.

FIG. 2 shows a second embodiment of an optical system 100, in which optical devices 102, 104 are configured to carry out an optical connection check and, as the case may be, a check whether the correct specific (type) of optical device has been connected. Each of the optical devices 102, 104 comprises an optical transmit device 122 and an optical receiver device 126, having the functionality as described above. Each of the control devices 224 and 228 are configured to realize the functionality of both control devices 124 and 128 of the embodiment according to FIG. 1, i.e. both control devices 224 and 228 are configured to control the optical transmit device 122 and to receive the electrical connection signal $S_{c,el}$ and evaluate this signal whether the one or more criteria for a positive connection check are fulfilled.

As apparent from FIG. 2, the output port of the optical transmitter device 122 of the optical device 102 is optically connected to port P1 (that serves as transmit control port) of the multi-fiber optical device connector 108 and the optical input port of the optical receiver device 126 of the optical device 104 is connected to port P1 (that serves as receive control port) of the multi-fiber optical device connector 110. Thus, the optical path between the ports P1 of the optical multi-fiber optical device connectors 108 and 110 is used in order to guide the optical connection signal $S_c$ from the optical device 102 to the optical device 104. Further, the output port of the optical transmitter device 122 of the optical device 104 is connected to port P12 (that serves as transmit control port) of the multi-fiber optical device connector 110 and the input port of the optical receiver device 126 of the optical device 102 is connected to port P12 (that serves as receive control port) of the multi-fiber optical device connector 108. Thus, the optical path between the ports P12 of the optical multi-fiber optical device connectors 110 and 108 is used in order to guide a further optical connection signal $S_c$ from the optical device 102 to the optical device 104.

As both optical connection signals $S_c$ are guided (in opposite directions) over separate optical paths, which are not used for simultaneously guiding wanted optical data signals, both optical devices 102, 104 can carry out the connection check (and additionally receive information from the respective opposite optical device) without generating any influence on the wanted optical data signals.

As shown in FIG. 2, optical ports of the multi-fiber optical device connectors in opposite outer regions of the device connectors are preferably used in order to guide the two optical connection signals $S_c$, as there is a high probability, if these ports are correctly connected, that also the ports in an intermediate range of the series of ports and, as the case may be, neighboring outer ports are correctly connected to the corresponding ports of the respective multi-fiber cable connectors.

As the embodiment shown in FIG. 2 differs from the embodiment shown in FIG. 1 only in that both optical devices 102, 104 are configured to create and transmit an optical connection signal $S_c$ to the respective other optical device 104, 102 and to receive and examine an optical connection signal $S_c$ from the respective other optical devices, the above explanations concerning the embodiment shown in FIG. 1 fully apply to the embodiment shown in FIG. 2.

Figure 3:
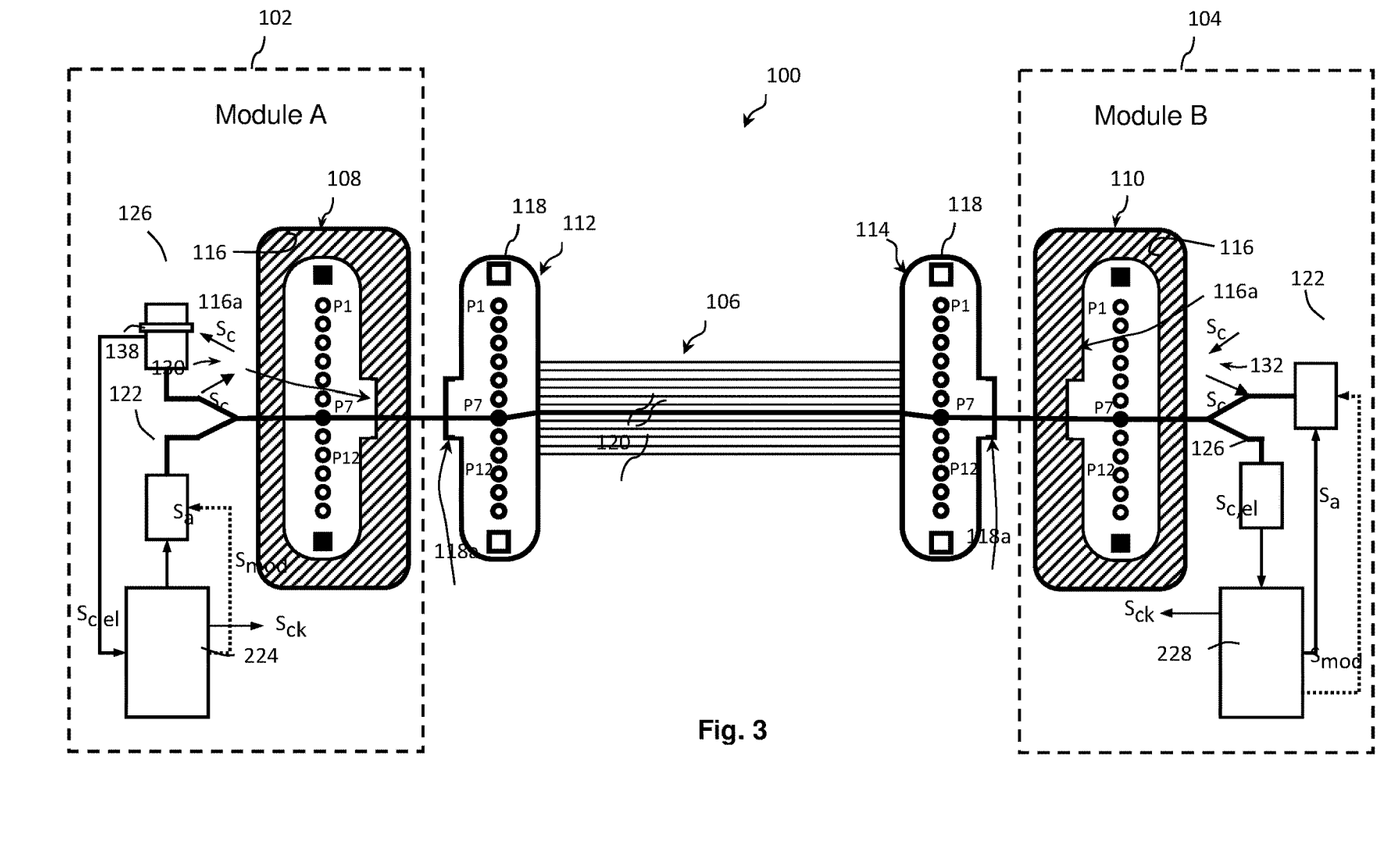
FIG. 3 shows a third embodiment, similar to the embodiment in FIG. 2, wherein a single optical path is used for both optical connection signals.

The embodiment of an optical system 100 shown in FIG. 3 is practically identical to the embodiment according to FIG. 2 as far as the functionality of creating the optical connection signals $S_c$ and receiving and evaluating the optical collection signals $S_c$ is concerned. However, contrary to the embodiment shown in FIG. 2, the embodiment in FIG. 3 uses a single optical path for guiding both optical connection signals $S_c$ in opposite directions.

For this purpose, the optical paths for the optical connection signal $S_c$ that is created at the optical device 102 and the optical connection signal $S_c$ that is received at the optical device 102 are separated by means of an optical 3-port device 130. A first splitting port of this optical 3-port device 130 is optically connected to the output port of the optical transmitter device 122 and a second splitting port of this optical 3-port device 130 is optically connected to the input port of the optical receiver device 126. Further, a common port of the optical 3-port device 130 is connected to a selected optical port P7 (that serves as a common transmit and receive control port) of the multi-fiber optical cable connector 108. The optical 3-port device 130 is configured to output the optical connection signal $S_c$ that is received, at the first splitting port, from the optical transmitter device 122 at the common port and to output, at the second splitting port, the optical connection signal $S_c$ that is received at the common port.

In a similar manner, the optical paths for the optical connection signal $S_c$ that is created at the optical device 104 and the optical connection signal $S_c$ that is received at the optical device 104 are separated by means of an optical 3-port device 132. A first splitting port of this optical 3-port device 132 is optically connected to the output port of the optical transmitter device 122 and a second splitting port of this optical 3-port device 132 is optically connected to the input port of the optical receiver device 126. Further, a common port of the optical 3-port device 132 is connected to a corresponding optical port P7 (that serves as a common transmit and receive control port) of the multi-fiber optical cable connector 110. The optical 3-port device 132 is configured to output the optical connection signal $S_c$ that is received, at the first splitting port, from the optical transmitter device 122 at the common port, and to output, at the second splitting port, the optical connection signal $S_c$ that is received at the common port.

As in case of the embodiment shown in FIG. 1, in the embodiment shown in FIG. 3 the optical ports of the multi-fiber device connectors 108, 110 that are used for establishing the common paths of both optical connection signals $S_c$ (i.e. the common transmit and receive control ports) lie in a middle or central portion of the series of ports. As apparent from FIG. 3, the ports P7 of the multi-fiber device connectors 108, 110 are used.

The optical 3-port devices 130, 132 may be realized as optical circulators or optical 1×2 couplers, especially symmetrical 1×2 couplers having a split ratio of 50:50. However, if optical 1×2 couplers shall be used (these are considerably less expensive than optical circulators), a considerable attenuation is caused in the path of the optical connection signals $S_c$. Further, the optical connection signal $S_c$ that is created at the respective optical device is reflected at the 1×2 coupler and the reflected signal portion is guided, together with the optical connection signal $S_c$ that is received from the respective other optical device, to the optical receiver device 126. If the reflectivity of the 1×2 coupler is too high, this might lead to a false result of the connection check.

In order to avoid this negative effect (in case of all types of 3-port devices that cause such an inacceptable reflection of the signal received at one of the splitting ports to the other one of the splitting ports), different wavelengths or different optical bands may be used for the optical connection signal $S_c$ that is created at the optical device 102 and the optical connection signal $S_c$ that is created at the optical device 104.

Further, an optical filter 138 may be provided between the input port of the respective optical receiver device 126 and the splitting port of the respective optical 1×2 coupler 130, 132 that is coupled to the optical receiver, wherein the optical filter means is configured to pass the wavelength (or at least a considerable portion of the spectrum) of the optical connection signal $S_c$ that is received at the common port of the optical 1×2 coupler 130, 132 and to block the wavelength (or at least most of the spectral portions) of the reflected portion of the optical connection signal $S_c$ supplied to the splitting port.

In order to generate the optical connection signals $S_c$, the optical transmitter devices 122 of the optical devices 102, 104 may comprise inexpensive light emitting diodes as, if at all, the optical connection signals comprise a low-frequency modulation component only. Further, as the multi-fiber optical cable between the optical devices is usually short (e.g. has a length of less than one meter up to a couple of meters), the alternation of the optical path between the respective optical transmitter device 122 and the respective optical receiver device 126 is low so that it is sufficient if the optical connection signals are coupled into the optical path at a relatively low optical power. However, it is of course also possible to use low cost optical lasers for the optical transmitter devices 122. This applies to all embodiments of the present invention.

Figure 4:
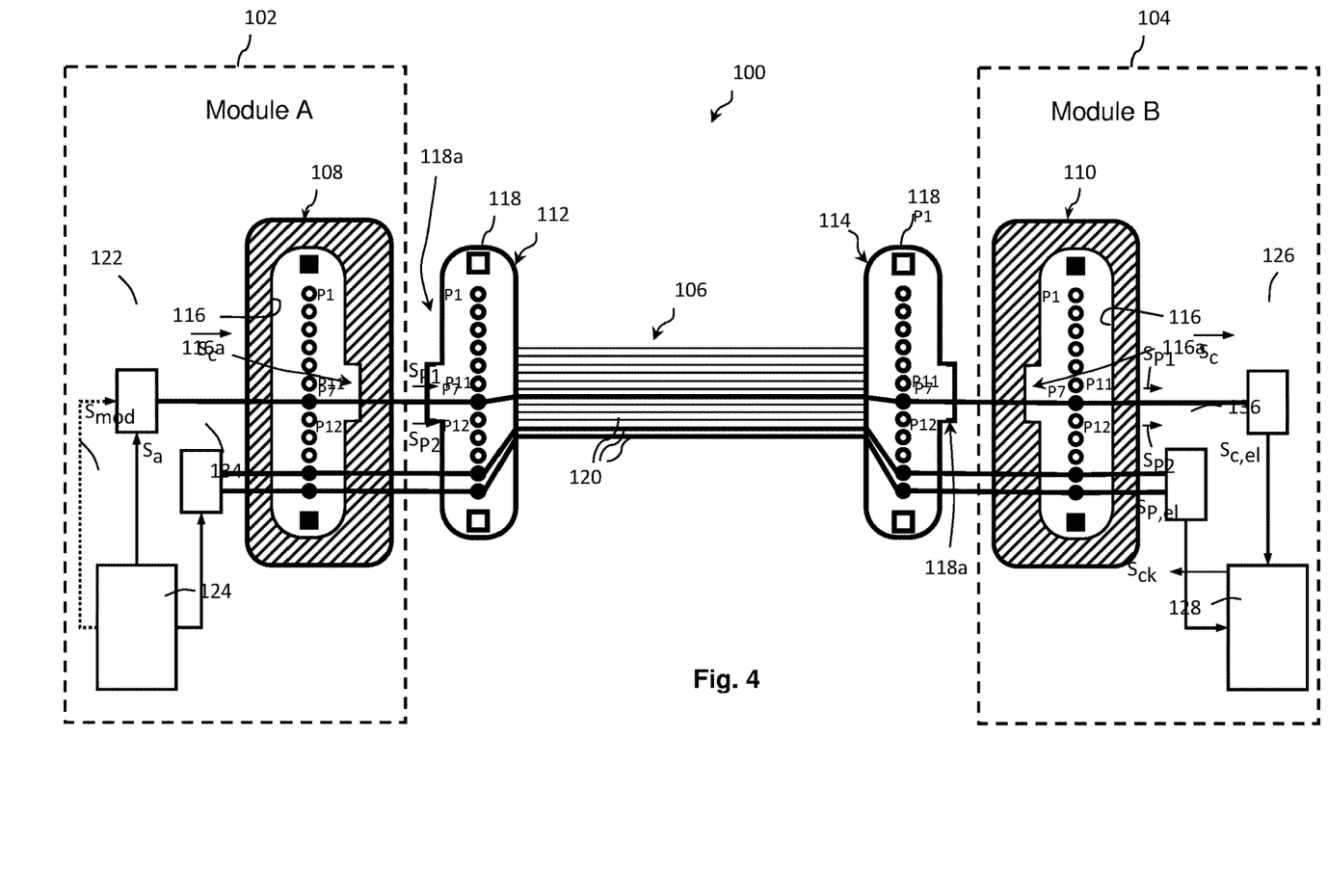
FIG. 4 shows a fourth embodiment similar to the embodiment in FIG. 1, wherein additionally a "power-over-fiber" connection using optical paths separate from the optical path of the connection signal is realized.

FIG. 4 shows a further embodiment of an optical system 100, which combines the embodiment according to FIG. 1 with means to transfer energy from the optical device 102 to the optical device 104. This makes it possible to design the optical device 104 without an own power source.

These means to transfer energy comprise an optical power source 134 which, in the embodiment shown in FIG. 4, is configured to create two optical power signals $S_{P1}$, $S_{P2}$ which are supplied to the optical ports P11, P12 of the multi-fiber device connector 112 of the optical device 102. The optical power source 134 may comprise two power lasers which, for example, create the optical power signals $S_{P1}$, $S_{P2}$ in a wavelength range around 850 nm. As these power signals are not used as general signals of the WDM transmission system, low-cost power lasers may be used which create the optical power signals with a spectrum of several nanometers or even several tens of nanometers. Also there is no need to design the power lasers in such a way that can be modulated at a high bit rate. Of course, the output ports of the optical parcels 134 may be connected to the optical ports P11, P12 by means of optical fibers.

The optical device 104 comprises a light-to-power converter 136, which comprises two input ports that are coupled to the optical ports P11, P12 of the multi-fiber device connector 114. Each of the input ports may be coupled to a converter element, e.g. a suitable photocell. The light-to-power converter 136 converts the optical power of the optical power signals $S_{P1}$, $S_{P2}$ into an electrical power signal $S_{P,el}$. The electrical power signal $S_{P,el}$ can be used in order to provide electrical energy to the optical devices 104, especially the control device 128.

As the optical power signals $S_{P1}$, $S_{P2}$ are guided in separate optical paths they do not negatively influence any wanted optical data signal. Further, the optical devices 102 and 104 are galvanically separated as the transmission of energy is effected without any electrical connection.

Of course, instead of two separate ports of the multi-fiber device connectors, any arbitrary numbers of ports can be used for such a power-over-fiber transmission. Also, instead of an optical power source 134 that has two or more output ports, a separate optical power source may be used in order to create an optical power signal that is supplied to a dedicated optical word of the multi-fiber device connector. Likewise, instead of using a single light-to-power converter comprising two or more input ports, a single light-to-power converter may be provided for converting each of the optical power signals into electrical power.

Figure 5:
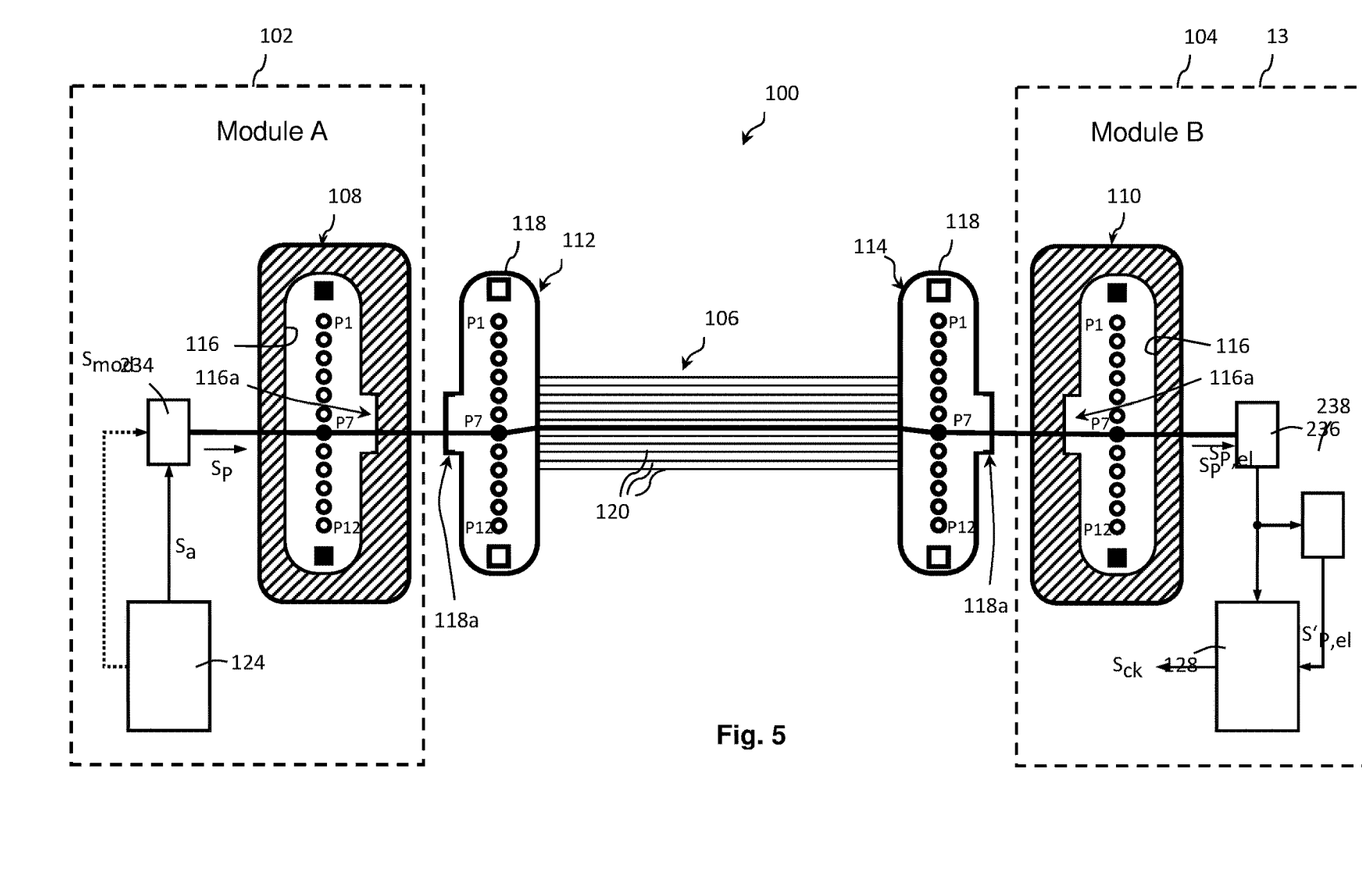
FIG. 5 shows a fifth embodiment of the invention similar to the embodiment according to FIG. 1, wherein an additional "power-over-fiber" connection is implemented by creating and using the connection light signal as an optical power signal and wherein the electrical power signal is used for the connection check as well as for supplying electrical energy to the optical device.

The embodiment of an optical system 100 according to FIG. 5 is similar to the first embodiment according to FIG. 1, wherein the optical transmitter device is designed as optical power source 234 that creates an optical power signal $S_P$ which is used as an optical connection signal as well as to transfer energy to the optical devices 104. In the example shown in FIG. 5, the optical power source 234 may comprise a single power laser having properties as explained above. As in the embodiment according to FIG. 1, the optical power source 234 may be modulated in order to additionally transfer information to the optical device 104.

The optical devices 104 of the embodiment according to FIG. 5 comprises a light-to-power converter 236 which is not only configured to convert the optical power signal $S_P$ into an electrical power signal $S_{P,el}$ but also as an electrical connection signal, i.e. the light-to-power converter 236 creates an electrical signal having a course in time closely depending on the course in time of the optical power signal $S_P$. In case the optical power signal $S_P$ comprises a modulation component, e.g. an amplitude modulation component in order to transfer information, the light-to-power converter 236 must be capable to convert the optical power signal $S_P$ into an electrical power signal $S_{P,el}$ which comprises an amplitude modulation component corresponding to the amplitude modulation component of the optical power signal $S_P$.

As apparent from FIG. 5, the electrical power signal $S_{P,el}$ is not only supplied to the control unit 128 at an input port at which the electrical power signal $S_{P,el}$ is treated as an electrical connection signal but also to a stabilizing unit or device 238 which is configured to convert the electrical power signal $S_{P,el}$ into a stabilized electrical power signal $S'_{P,el}$. This might be necessary if the optical power signal $S_P$ and thus also the electrical power signal $S_{P,el}$ comprises a modulation component and the control unit 128 does not tolerate a power supply that reveals oscillations (which e.g. are created if the optical power of the optical power signal is amplitude modulated). However, if the optical power signal $S_P$ reveals a sufficient stability (e.g. if the modulation component is present or the modulation component is created in such a way that it does not influence the average power in a way that cannot be tolerated by the optical device 104), the stabilizing device 238 can be omitted and the electrical power signal $S_{P,el}$ may be directly used as a power signal and thus be directly supplied to the respective power supply port of the control device 128.

As apparent from this description, the embodiment according to FIG. 5 requires only a single optical path between the optical devices 102 and 104 in order to carry out a connection check, to transfer information, especially identification and management information, and to transfer energy from the optical devices 102 to the optical device 104. That is, only a single optical port (that serves as a transmit control port) of the multi-fiber device connectors 108, 110, and thus only a single optical port (that serves as a receive control port) of the multi-fiber cable connectors 112, 114, must be free (i.e. not be used in order to transfer wanted optical data signals between the optical devices).

Figure 6:
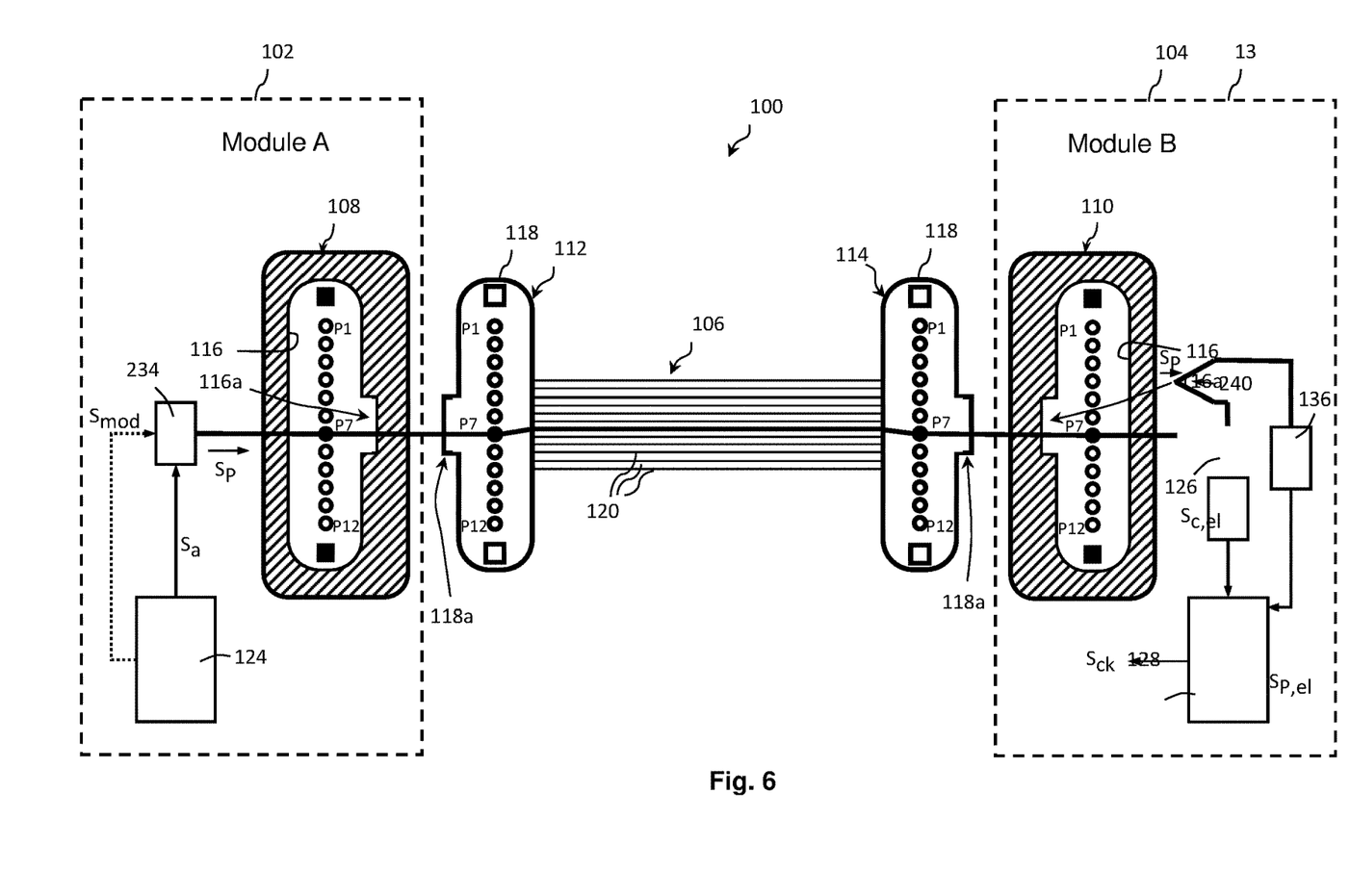
FIG. 6 shows a sixth embodiment similar to the embodiment in FIG. 5, wherein the optical path of the optical power signal is separated and a major portion of the optical power of the optical power signal in a first splitting path is converted into electrical energy and a minor portion of the optical power of the optical power signal in a second splitting path is used to carry out the connection check.

FIG. 6 shows a further embodiment of an optical system 100, which differs from the embodiment according to FIG. 5 in the design of the optical device 104, only. In this embodiment, the optical path comprising the optical power signal $S_P$ (which simultaneously serves as an optical control signal) is splitted by means of an optical 1×2 splitter 240. Preferably, the optical splitter is an asymmetrical 1×2 splitter, wherein a common port of the splitter 240 is connected to the optical port P7 (that serves as a receive control port), a first splitting port is connected to an input port of an optical receiver device 126 and a second splitting port is connected to an input port of a light-to-power converter 136. The asymmetrical 1×2 splitter is configured to supply a major portion of the optical power of the optical signal $S_P$ to the light-to-power converter 136 and to supply a minor portion (e.g. a few percent or even less than 1%) of the optical power to the optical receiver device 126. The functionality of the optical receiver device 126 and the light-to-power converter 136 corresponds to the function of the respective devices described in connection with the embodiment in FIG. 4 (wherein, of course, the light-to-power converter 136 in FIG. 6 has a single input port only).

Figure 7:
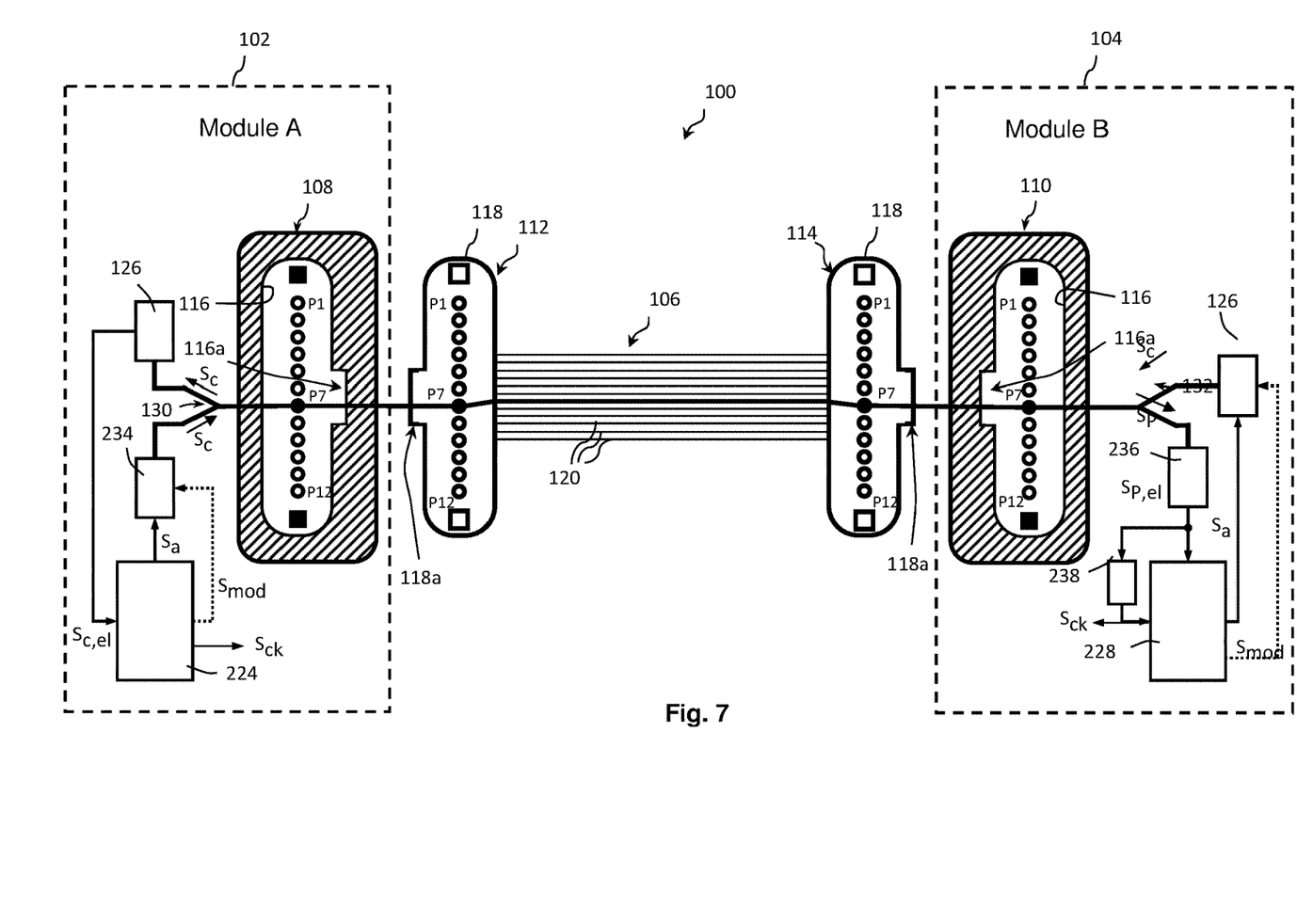
FIG. 7 shows a seventh embodiment similar to the embodiment in FIG. 3, wherein the optical connection signal that is transmitted to module B simultaneously serves as an optical power signal.

FIG. 7 shows a further optical system 100 which is in most points similar to the embodiment according to FIG. 3. However, in the embodiment according to FIG. 7 additionally an optical connection signal $S_c$ is transmitted from the optical device 104 to the optical device 102, wherein a common optical path between the ports P7 of the multi-fiber device connectors 108, 110 according to the system described in connection with FIG. 3 is used. Thus, in the following, the differing features will be described only.

Instead of an optical transmit device 122, the optical device 102 of the embodiment in FIG. 7 comprises an optical power source 234 as described in connection with the embodiment shown in FIG. 5. That is, the optical power source 234 is configured to create an optical power signal $S_P$ that simultaneously serves as an optical connection signal in the control of a control device 224. As explained above, the control device 224 and the optical power source 234 may be configured to create the optical power signal $S_P$ in such a way that it additionally comprises a modulation component in order to transport information to the optical device 104.

The optical device 104 according to the embodiment in FIG. 7 comprises, instead of the optical receiver device 126 of the embodiment shown in FIG. 3, a light-to-power converter 236 and a stabilizing device 238 in order to treat the optical power signal $S_P$ as described in connection with the embodiment according to FIG. 5.

The optical 3-port device 132 may, as described above, be realized as optical circulator or optical coupler. However, if the 3-port device is an optical coupler, an asymmetrical optical 1×2 coupler is preferred, which is configured to supply a major portion to the light-to-power converter 236. Of course, an asymmetrical 1×2 coupler may be realized as wavelength dependent coupler if the optical power signal $S_P$, that is transmitted from the optical device 102 to the optical device 104 and the optical connection signal $S_c$ that is transmitted in the reverse direction, have different wavelengths or lie in different optical bands.

Thus, the system 100 in FIG. 7 combines the embodiment in FIG. 3, which uses two optical connection signals in both directions with the embodiment in FIG. 5, in which the optical connection signal that is transmitted from the optical device 102 to the optical device 104 is created (in the optical device 102) and processed as an optical power signal (in the optical device 104).

LIST OF REFERENCE SIGNS 100 optical system
102 optical device
104 optical device
106 multi-fiber optical connection cable
108 multi-fiber device connector
110 multi-fiber device connector
112 multi-fiber cable connector
114 multi-fiber cable connector
116 receiving opening
116a recess
118 connector casing
118a notch
120 optical fiber
122 optical transmitter device
124 control device
126 optical receiver device
128 control device
130 optical 3-port device
132 optical 3-port device
134 optical power source
136 light-to-power converter
138 optical filter
224 control device
228 control device
234 optical power source
236 light-to-power converter
238 stabilizing device
240 (asymmetrical) optical 1×2 splitter
P1 to P12 optical port
$S_a$ activation signal
$S_c$ optical connection signal
$S_{ck}$ connection check signal
$S_{c,el}$ electrical connection signal
$S_{mod}$ modulation signal
$S_P$ optical power signal
$S_{P1}$ optical power signal
$S_{P2}$ optical power signal
$S_{P,el}$ electrical power signal

The invention claimed is:

1. An optical connecting system for connecting a first and a second optical device, the optical connecting system comprising
    (a) a first and a second multi-fiber device connector comprised in the first and second optical device, respectively, and
    (b) a multi-fiber optical connection cable comprising a plurality of optical fibers and having a first and a second multi-fiber cable connector at a respective first and second end thereof and being adapted to be connected to the first and second multi-fiber device connector,
    (c) wherein the first and second optical devices are configured to transmit to and/or receive from the respective other optical device one or more wanted optical data signals via selected optical fibers of the multi-optical fiber connection cable,
    wherein
    (d) the first optical device is configured to supply a first optical connection signal to a transmit control port of the first multi-fiber device connector and
    (e) wherein the second optical device is configured to receive the first optical connection signal that is transmitted through a respective optical fiber of the multi-fiber optical connection cable to a receive control port of the second multi-fiber device connector,
    (f) wherein no wanted optical data signal is transmitted over the optical path that guides the first optical connection signal, and
    (g) wherein the second optical device is configured to detect whether the first optical connection signal received matches one or more predetermined criteria, wherein the second optical device is configured to assume a correct connection to the first optical device via the multi-fiber optical connection cable if the one or more predetermined criteria are matched.

2. The optical connecting system according to claim 1, wherein
(a) the second optical device is configured to supply a second optical connection signal to a transmit control port of the second multi-fiber device connector and
(b) wherein the first optical device is configured to receive and detect the second optical connection signal that is transmitted through a respective optical fiber of the multi-fiber optical connection cable to a receive control port of the first multi-fiber device connector,
(c) wherein no wanted optical data signal is transmitted over the optical path that guides the second optical connection signal, and
(d) wherein the first optical device is configured to detect whether the second optical connection signal received matches one or more predetermined criteria, wherein the first optical device is configured to assume a correct connection to the second optical device via the multi-fiber optical connection cable if the one or more predetermined criteria are matched.

3. The optical connecting system according to claim 2, wherein the transmit control port and the receive control port of the first multi-fiber device connector of the first optical device and the transmit control port and the receive control port of the second multi-fiber device connector of the second optical device are separate ports, and that the first and second optical connection signals are guided in separate optical paths, each comprising a separate optical fiber of the multi-fiber optical connection cable.

4. The optical connecting system according to claim 3, wherein the first and/or second multi-fiber device connector comprises a plurality of ports, including the respective transmit and receive control ports, which are provided in an elongate cross-section having a first and second outer end region lying opposite each other, wherein the respective transmit control port is provided in the first outer end region and the respective receive control port is provided in the second outer end region.

5. The optical connecting system according to claim 4, wherein the plurality of ports are arranged in one row or several parallel rows and that the respective transmit and receive control ports are located at the end of a selected one of the rows.

6. The optical connecting system according to claim 2, wherein the transmit control port and the receive control port of the first multi-fiber device connector are physically identical and form a common control port to which the first optical device supplies the first optical connection signal and at which the first optical device receives the second optical connection signal, and that the transmit control port and the receive control port of the second multi-fiber device connector are physically identical and form a common control port to which the second optical device supplies the second optical connection signal and at which the second optical device receives the first optical connection signal.

7. The optical connecting system according to claim 6, wherein the first and/or second multi-fiber device connector comprises a plurality of ports, including the respective common control port, which are provided in an elongate cross-section having a first and second outer end region lying opposite each other and a center portion between the first and second outer end region, wherein the respective common control port is provided in the center portion.

8. The optical connecting system according to claim 6, wherein
(a) each of the first and second optical devices comprises an optical 3-port device, wherein each optical 3-port device is configured
(i) to receive the respective first or second optical connection signal that is to be transmitted to the respective other optical device at a first port and to pass it through to a second port and
(ii) to receive the respective second or first optical connection signal that is to be received at the respective optical device at the second port and to pass it through to a third port.

9. The optical connecting system according to claim 8, wherein the first and second optical devices are configured to create the first and second optical connection signals at differing first and second wavelengths or in such a way that the optical spectra of the first and second connection signals do not overlap to a relevant extent and that the optical 3-port device is an optical splitter and wherein an optical filter is provided in the optical path of the optical connection signal between a splitting point or splitting portion of the optical splitter and its third port, wherein the optical filter is configured to essentially block a reflected portion of the optical connection signal that is supplied to the first port of the optical splitter.

10. The optical connecting system according to claim 9, wherein the optical splitter is an optical 3 dB-splitter.

11. The optical connecting system according to claim 1, wherein the first or the first and second optical devices comprise, in order to create and transmit the respective first or second optical connection signal, an optical transmitter device, which is directly or indirectly optically coupled to the respective transmit control port.

12. The optical connecting system according to claim 11, wherein the optical transmitter device is configured to create the respective first or second optical connection signal in such a way that it includes an identification information and/or management information to be transmitted to the respective other optical device, wherein the identification information comprises at least one of a predetermined wavelength or optical spectrum of the optical connection signal or is comprised in a modulation component of the optical connection signal and wherein the management information is comprised in a modulation component of the optical connection signal.

13. The optical connecting system according to claim 1, wherein the first or second optical device comprises, in order to receive and detect the respective second or first optical connection signal, an optical receiver device, which is optically coupled to the respective receive control port and which is configured to convert the respective second or first optical connection signal received into a second or first electrical control signal and to supply the second or first electrical control signal to a control device, which is configured to detect whether the second or first electrical control signal matches one or more predetermined criteria.

14. The optical connecting system according to claim 13, wherein the control device of the second or first optical device is configured to detect and evaluate the identification information and/or the management information.

15. The optical connecting system according to claim 13, wherein the respective other optical device that receives the optical power signal is configured to split the optical power signal asymmetrically, wherein a larger power portion of the optical power signal is supplied to a light-to-power converter and a smaller power portion is supplied to the optical receiver device.

16. The optical connecting system according to claim 1, wherein the first or second optical device comprises, in order to transfer energy to the respective other optical device, one or more optical power sources creating one or more optical power signals that are supplied to one or more power transmit ports of the respective multi-fiber device connector, and that the respective other optical device comprises one or more light-to-power converters which are configured to receive, from respective one or more power receive ports of the respective multi-fiber device connector, the optical power that is transmitted from the first or second optical device to the respective optical device, wherein no wanted optical data signal is transmitted over the optical paths that guide the one or more optical power signals.

17. The optical connecting system according to claim 1, wherein the second optical device comprises an optical power source which is configured to create an optical power signal and to supply the optical power signal to the control port of the second multi-fiber device connector via an optical path separating means, which is configured to separate/combine the optical paths of the first optical connection signal and the optical power signal, and wherein the first optical device is configured to receive the optical power signal, which is supplied to the transmit control port, via a path separating means, which is configured to separate/combine the optical paths of the first optical connection signal and the optical power signal, and to convert the optical power signal into electrical power.

18. The optical connecting system according to claim 1, wherein the first or second optical device comprises an optical power source which is configured to create the first or second optical connection signal as an optical power signal in order to additionally transfer energy to the respective other optical device and wherein the respective other optical device is configured to receive the optical power signal and to convert it into electrical power as well as to detect whether the respective optical power signal received matches one or more predetermined criteria, wherein the respective other optical device is configured to assume a correct connection to the first or second optical device via the multi-fiber optical connection cable if the one or more predetermined criteria are matched.

19. The optical connecting system according to claim 18, wherein the respective other optical device that receives the optical power signal is configured to supply the optical power signal to a light-to-power converter, which converts the optical power signal into a respective electrical power signal and is configured to supply the respective optical device with electrical power to and to supply the electrical power signal to a control device, which is configured to detect whether the respective optical power signal received matches one or more predetermined criteria.

20. An optical device for the optical connecting system according to claim 1, wherein
 (a) the optical device comprises a multi-fiber device connector, which is adapted to be connected to a first multi-fiber cable connector provided at a first end of a multi-fiber optical connection cable comprising a plurality of optical fibers and comprising a second multi-fiber cable connector at a second end thereof, the second multi-fiber cable connector being adapted to be connected to a further optical device of this kind, and
 (b) wherein the optical device is configured to transmit to and/or receive from the respective other optical device one or more wanted optical data signals via selected data signal ports of the multi-fiber device connector, wherein
 (c) the optical device is configured
  (i) to supply a first optical connection signal to a transmit control port of the multi-fiber device connector,
  (ii) wherein no wanted optical data signal is transmitted to or received at the transmit control port, and/or
 (d) wherein the optical device is configured
  (i) to receive a second connection signal at a receive control port of the multi-fiber device connector,
  (ii) wherein no wanted optical data signal is transmitted to or received at the receive control port,
  (iii) to detect whether the second optical connection signal received matches one or more predetermined criteria, and
  (iv) to assume a correct connection to the further optical device via the multi-fiber optical connection cable if the one or more predetermined criteria are matched.

* * * * *